United States Patent [19]

Ohsuga

[11] Patent Number: 5,173,373
[45] Date of Patent: Dec. 22, 1992

[54] GASKET FOR FUEL CELL

[75] Inventor: Masaru Ohsuga, Iwata, Japan

[73] Assignee: Yamaha Hatsudoki Kabushiki Kaisha, Iwata, Japan

[21] Appl. No.: 583,030

[22] Filed: Sep. 14, 1990

[30] Foreign Application Priority Data

Sep. 14, 1989 [JP] Japan .................. 1-236975
Sep. 14, 1989 [JP] Japan .................. 1-236976

[51] Int. Cl.⁵ .......................................... H01M 2/08
[52] U.S. Cl. ................................... 429/35; 429/36
[58] Field of Search .......................... 429/35, 36

[56] References Cited

U.S. PATENT DOCUMENTS 3,743,544 12/1970 Stewart, Jr. ............. 429/35
4,774,154 9/1988 Singelyn et al. ........ 429/36
4,978,590 12/1990 Granata, Jr. et al. .... 429/35

FOREIGN PATENT DOCUMENTS 58-128667 1/1983 Japan .

Primary Examiner—Shrive Beck
Assistant Examiner—Margaret V. Einsmann
Attorney, Agent, or Firm—Ernest A. Beutler

[57] ABSTRACT

Various gasket compositions and constructions adapted to be embodied in a phosphoric acid type fuel cell are provided, each of which is effective in sealing the outer edges of the electrodes and the electrolyte matrix of the fuel cell unit. In one embodiment, the gasket comprised of fluoric synthetic rubber which does not include metal oxide or metal hydroxide so that it will not deteriorate in the presence of the phosphoric acid.

In another embodiment, a sealing arrangement is provided which is adapted to be embodied in a fuel cell and includes a gasket and bonds positioned between the electrodes and the gasket. The bond is comprised of fluoric synthetic rubber and has a modulus of elasticity larger than the modulus of elasticity of the gasket so as to minimize deterioration of the bond.

In a third embodiment, a two-piece gasket is provided for use with a fuel cell, preferably of the phosphoric acid type.

6 Claims, 3 Drawing Sheets

GASKET FOR FUEL CELL

BACKGROUND OF THE INVENTION

This invention relates to gaskets for a fuel cell, and more particularly to improved gasket compositions comprised of fluoric synthetic rubber which do not include the addition of metal oxide and/or metal hydroxide so as to prevent deterioration of the gaskets by phosphoric acid. The invention further pertains to an improved construction and sealing arrangement for a fuel cell, wherein a seal is comprised of a gasket and a pair of bonds which are constructed so as to minimize deterioration of the bonds.

It is well known that a fuel cell produces electrical energy from an reaction of an enriched or reformed fuel and oxygen. Hydrogen is typically used as the fuel and may be obtained by reforming a methanol-water mixture in a reformer that is comprised of a catalyst and a heater for vaporizing the unreformed fuel. Air is normally the source of oxygen for the fuel cell. Oftentimes, a plurality of cell units are stacked in series so as to increase the output voltage generating capacity of the fuel cell.

One type of cell unit is comprised of an anode, a cathode, and an electrolyte matrix impregnated with an electrolyte, such as phosphoric acid, interposed between the anode and cathode. Aqueous phosphoric acid is generally known to be an excellent electrolyte in that it is stable but has a low vapor pressure around 200° C. and is also a good conductor. Phosphoric acid also rejects carbon dioxide, and at temperatures around 200° C. the anode is able to withstand carbon containing impurities such as carbon monoxide in the fuel gas.

A gasket may be used to seal the outer edges of the anode, cathode and electrolyte matrix of each cell unit. Typically, this gasket is comprised of silicone rubber or fluoric synthetic rubber. Although these materials are able to be used at temperatures around 200° C., previous compositions of such rubber materials tend to corrode in the presence of phosphoric acid at these temperatures. Previous compositions of fluoric synthetic rubber can also deteriorate at these high temperatures, which can decrease the elasticity of the rubber material.

The inventor has identified the source of this deterioration problem. The inventor has found that the cause of the deterioration is metal oxides and/or metal hydroxides, such as MgO, PbO or $Ca(OH)_2$, which are typically added to the fluoric synthetic rubber material with a cross linking agent for increasing the rate of formation of the molecular bridging structure of the rubber material. These metal oxides and/or metal hydroxides are sometimes present in the rubber material in the form of metallic salts and are also present in excess. Deterioration occurs when the metal oxides, metal hydroxides and/or metallic salts react with the phosphoric acid to form phosphates. Because of the strong affinity the phosphates have for the phosphoric acid, the rubber material absorbs a relatively large amount of phosphoric acid and swells. As a result, the fluoric synthetic rubber deteriorates and loses much of its elasticity.

It is therefore an object of this invention to provide improved gasket compositions for a fuel cell wherein the gasket materials will not corrode or deteriorate in the presence of phosphoric acid at temperatures around 200° C.

The inventor has also discovered an improved composition for bonds which can be used in between the electrodes and the gasket to improve the seal around the outer edges of the cell unit. Typically, the bonds have poor chemical resistance and poor thermostability as a result of their low molecular weight and the presence of some reactive functional groups in their molecular structure. Moreover, the stress generated as a result of the difference in thermal expansion between the electrodes and the gasket at fuel cell operating temperatures around 200° C., acts primarily on the bonds. As a result, the bonds tend to deteriorate relatively easily.

It is therefore another object of this invention to provide a sealing arrangement for a fuel cell, wherein one or more bonds are interposed between the electrodes and gasket of the fuel cell and are constructed so that any stress acting on the fuel cell will act primarily on the gasket so as to minimize deterioration of the bond.

SUMMARY OF THE INVENTION

In a first embodiment of the invention, a gasket adapted to be embodied in a phosphoric acid type fuel cell is provided. The fuel cell typically comprises a pair of electrodes, an electrolyte comprised of phosphoric acid interposed between the electrodes, and a gasket comprised of fluoric synthetic rubber such that it will not deteriorate in the presence of the phosphoric acid.

A second embodiment of this invention is adapted to be embodied in a fuel cell comprising a pair of electrodes, an electrolyte comprised of phosphoric acid interposed between the electrodes, a gasket and a bond positioned between at least one of the electrodes and a gasket. The bond is comprised of fluoric synthetic rubber and has a modulus of elasticity larger than the modulus of elasticity of the gasket so as to minimize deterioration of the bond.

In a third embodiment of the invention, a two-piece gasket is provided for use with a fuel cell, preferably of the phosphoric acid type.

DETAILED DESCRIPTION OF THE PREFERRED EMBODIMENTS

Figure 1:
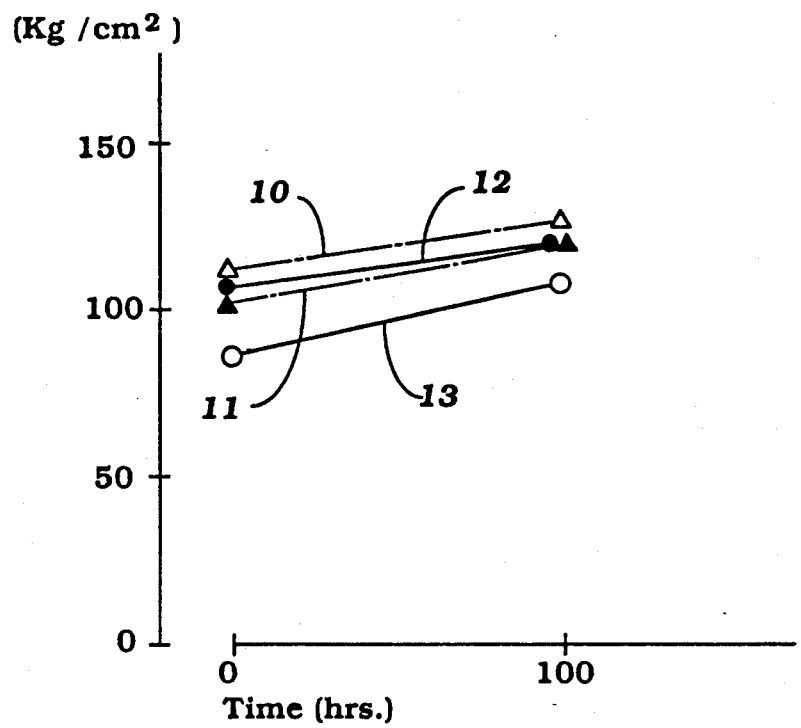
FIG. 1 shows the change in tensile strengths of various gasket compositions as a function of the time in which the gaskets are immersed in phosphoric acid at a temperature of approximately 200° C. The phosphoric acid has a concentration of 105% calculated in terms

Referring first to FIG. 1, the change in tensile strengths of various gasket compositions plotted against the number of hours in which the gaskets have been soaked in phosphoric acid are shown. The concentration of the phosphoric acid is calculated in terms of orthophosphoric acid, although other types of phosphoric acid can also be used, such a pyrophosphoric acid, triphosphoric acid or normal condensation phosphoric acid of up to the 8th or 9th grade in condensation level.

The change in tensile strength of a first gasket composition is indicated by the reference numeral 10 with the data points represented by hollow triangles. This gasket is comprised of fluoric synthetic rubber, the main ingredient of which is the material sold under the trademark "G902" by Daikin Kogyo Co., Ltd., which material is fluoric synthetic rubber having iodine as bridging sites and which does not require metal oxide or metal hydroxide for construction of the molecular bridging structure of the rubber material. "G902" constitutes 100 parts or approximately 79.7% by weight of the total gasket composition. This gasket is further comprised of carbon (MT Carbon) which constitutes 20 parts or approximately 15.9% by weight of the total gasket composition. This gasket further includes the material sold under the trademark "Perhexa 25B" by Nippon Oils & Fats Co., Ltd., which material is 2.5-Dimethyl-2, 5-di(t-butylperoxy)hexane. "Perhexa 25B" constitutes 1.5 parts or approximately 1.2% by weight of the total gasket composition. Triallyl isocyanulate is also included in this gasket and constitutes 4.0 parts or approximately 3.2% by weight of the total gasket composition.

The change in tensile strength of a second gasket composition is indicated by the reference numeral 11 with the data points represented by solid triangles. This gasket is comprised of fluoric synthetic rubber, the main ingredient of which is the material sold under the trademark "G912" by Daikin Kogyo Co., Ltd., which material is fluoric synthetic rubber having iodine as bridging sites and which does not require metal oxide or metal hydroxide for construction of the molecular bridging structure of the rubber material. "G912" constitutes 100 parts or approximately 79.7% by weight of the total gasket composition. This gasket is further comprised of carbon (MT Carbon) which constitutes 20 parts or approximately 15.9% by weight of the total gasket composition. This gasket further includes the material sold under the trademark "Perhexa 25B" by Nippon Oils & Fats Co., Ltd. "Perhexa 25B" constitutes 1.5 parts or approximately 1.2% by weight of the total gasket composition. Triallyl isocyanulate is also included in this gasket and constitutes 4.0 parts or approximately 3.2% by weight of the total gasket composition.

Alternately, either of the above two gasket compositions can include the materials "G901" or "G1001" as the main ingredient of the fluoric synthetic rubber instead of "G902" or "G912". These former materials are sold under the trademarks "G901" and "G91001" by Daikin Kogyo Co., Ltd., and are also fluoric synthetic rubber having iodine as bridging sites and which does not require metal oxide or metal hydroxide for construction of the molecular bridging structure of the rubber material.

The change in tensile strength of a third gasket composition for comparison purposes is indicated by the reference numeral 12 with the data points represented by solid circles. This gasket is comprised of fluoric synthetic rubber, the main ingredient of which is the material sold under the trademark "Viton GF" by DuPont Co., Ltd., which material is fluoric synthetic rubber having bromine as bridging sites and which does require metal oxide or metal hydroxide for construction of the molecular bridging structure of the rubber material. "Viton GF" constitutes 100 parts or approximately 91.74% by weight of the total gasket composition. This gasket is further comprised of Litharge (PbO), the material sold under the trademark "Perhexa 25B" by Nippon Oils & Fats Co., Ltd. and Triallyl isocyanulate. These last three components each constitute 3.0 parts or approximately 2.75% by weight of the total gasket composition.

The change in tensile strength of a fourth gasket composition for comparison purposes is indicated by the reference numeral 13 with the data points represented by hollow circles. This gasket is comprised of fluoric synthetic rubber, the main ingredient of which is the material sold under the trademark "Viton B-50" by DuPont Co., Ltd., which material is fluoric synthetic rubber having bromine as bridging sites and which does require metal oxide or metal hydroxide for construction of the molecular bridging structure of the rubber material. "Viton B-50" constitutes 93.2 parts or approximately 85.5% by weight of the total gasket composition. This gasket is further comprised of the materials sold under the trademarks "Viton Curatives #20" and "Viton Curatives #30" by DuPont Co., Ltd., which materials are mixtures of cross-linking agents. "Viton Curatives #20" constitutes 3.0 parts or approximately 2.75% by weight of the total gasket composition and "Viton Curatives #30" constitutes 3.8 parts or approximately 3.5% by weight of the total gasket composition. This gasket is further comprised of high activity magnesium hydroxide which constitutes 3.0 parts or approximately 2.75% by weight of the total gasket composition. Calcium hydroxide is also included in this gasket and constitutes 6.0 parts or approximately 5.5% by weight of the total gasket composition.

Figure 2:
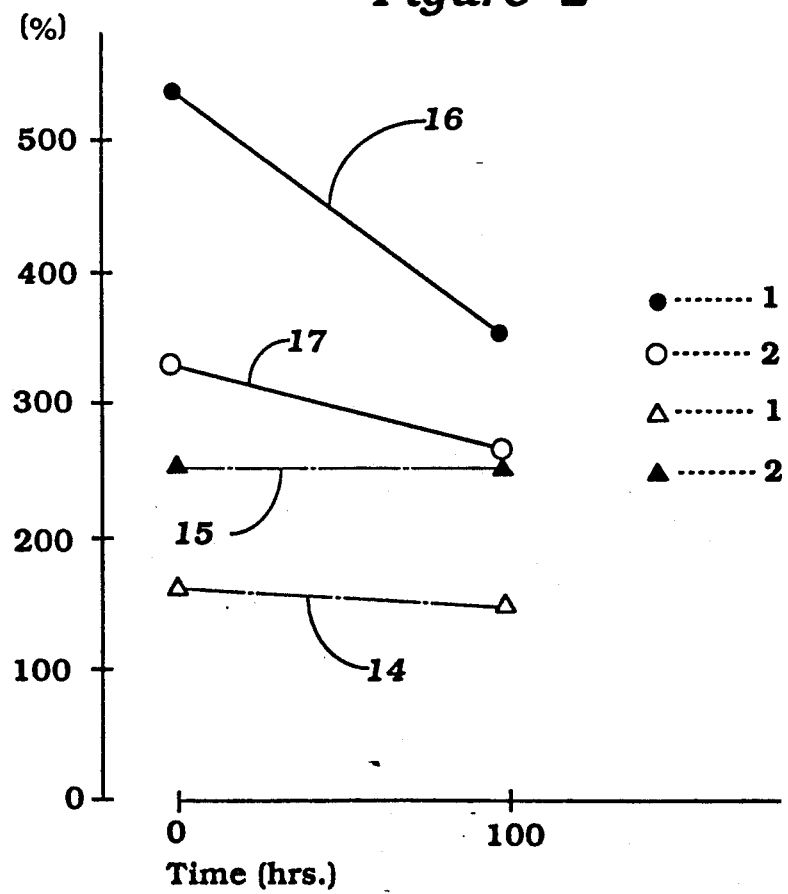
FIG. 2 shows the elongation at the breaking point of each of the gasket compositions of FIG. 1 plotted against the time in hours in which the gaskets are immersed in phosphoric acid at a temperature of approximately 200° C.

FIG. 2 shows the elongation at the breaking point of each of the gasket compositions of FIG. 1 plotted against the time in hours in which the gaskets are soaked in phosphoric acid at a temperature of approximately 200° C. The elongation change of the first, second, third and fourth gasket compositions are indicated by the numerals 14, 15, 16 and 17 respectively. The data points of each of these compositions is designated in the same manner as in FIG. 1.

Figure 3:
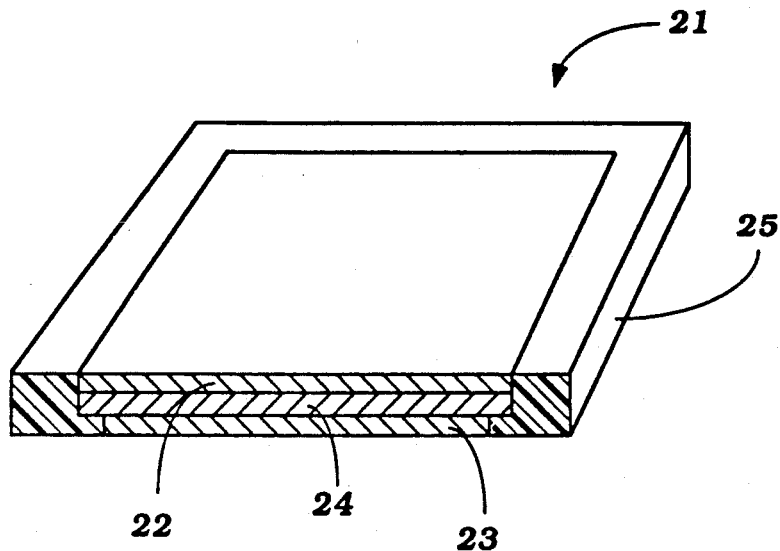
FIG. 3 illustrates a cell unit constructed in accordance with an embodiment of the invention.
Figure 4:
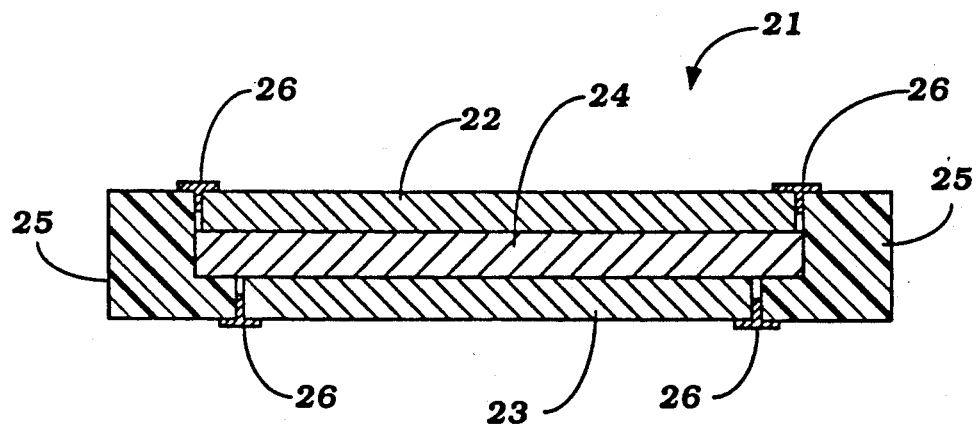
FIG. 4 is a cross sectional view of a cell unit constructed in accordance with an embodiment of the invention, showing a gasket and bonds interposed between the gasket and the electrodes.

Referring now to FIGS. 3 and 4, another embodiment of the invention is illustrated. In these figures, a fuel cell unit is identified generally by the reference numeral 21. Although only one cell unit is depicted in the drawings, it is to be understood that the invention can be utilized in connection with fuel cells having more than one cell unit. Each cell unit 21 includes a pair of electrodes 22 and 23, one of which is a cathode and the other of which is an anode. Each cell unit 21 further comprises an electrolyte matrix 24 containing an electrolyte, such as phosphoric acid, and interposed between the electrodes 22 and 23. Both electrodes 22 and 23 are typically constructed of porous graphite and may have a small amount of platinum catalyst on the surface facing the matrix 24.

A gasket is identified by the reference numeral 25. The inner surfaces of this gasket 25 are in contact with the outer edges of the electrodes 22 and 23 and the electrolyte matrix 24 so as to provide a seal around the outer edges of the cell unit 21. As shown in FIG. 4, a pair of bonds is identified by the numeral 26. To further improve the seal around the outer edges of the cell unit 21, a pair of bonds 26 are provided, one of which is positioned between the outer edge of electrode 22 and an inner surface of the gasket 25 and the other of which is positioned between the outer edge of electrode 23 and another inner surface of the gasket 25. The bonds 26 are comprised of fluoric synthetic rubber and have a modulus of elasticity which is larger than the modulus of elasticity of the gasket 25. With this construction, the stress generated as a result of the difference in thermal expansion between the electrodes 22 and 23 and the gasket 25 at fuel cell operating temperatures around 200° C. acts primarily on the gasket 25, rather than the bonds 26. Consequently, the deterioration of the bonds 26 is greatly reduced so as to maintain a highly effective seal for each cell unit 21.

The gasket 25 for use with this embodiment may have any of the gasket compositions set forth above or, alternatively, may also be made of sponge comprised of closed-cellular or fluoric synthetic sponge rubber which does not include the addition of metal oxide or metal hydroxide.

Figure 5:
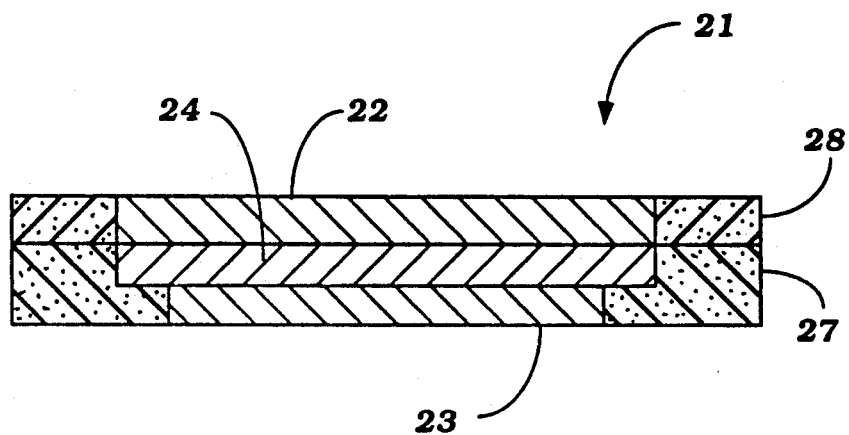
FIG. 5 is cross sectional view of a cell unit constructed in accordance with another embodiment of the invention wherein the gasket is of a two-piece construction.
Figure 6:
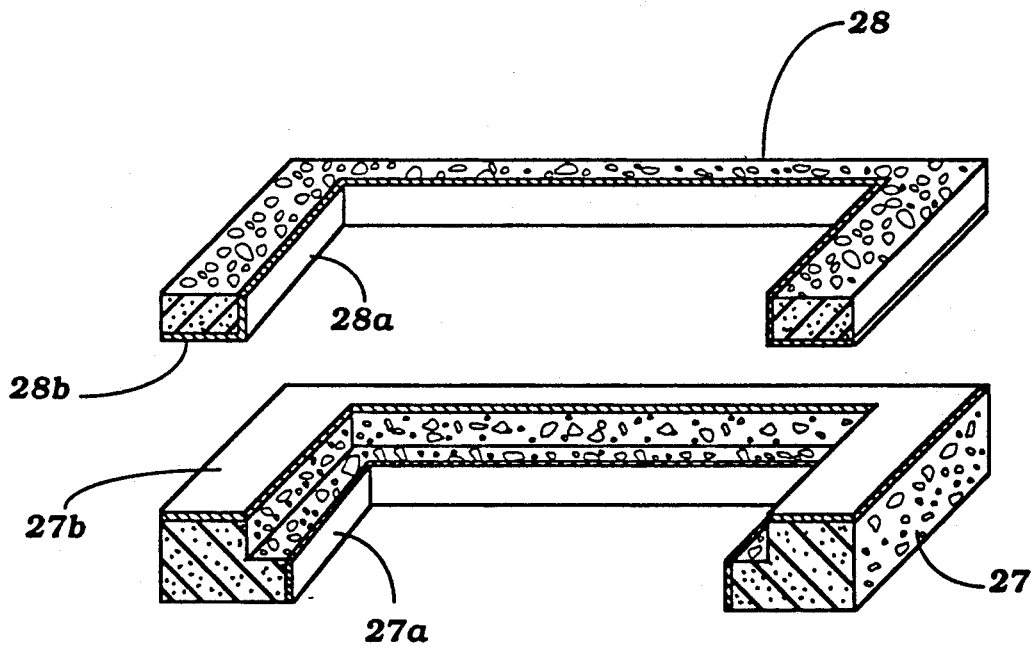
FIG. 6 is a detailed view of the two-piece gasket of FIG. 5.

FIGS. 5 and 6 illustrate yet another embodiment of the invention wherein the gasket 25 is comprised of two pieces identified by the reference numerals 27 and 28 for sealing the outer edges of the electrodes 23 and 22 and the electrolyte matrix 24 of the cell unit 21. The gasket pieces 27 and 28 each have a smooth inner surface 27a and 28a respectively which is in contact with one of the electrodes 23 or 22 respectively so that the cell unit 21 is completely sealed around the outer edges thereof. Each gasket piece 27 and 28 also has a surface 27b and 28b respectively which adjoin and are in contact with each other during operation of the fuel cell.

It should be readily apparent from the foregoing description that improved gasket compositions and constructions for a phosphoric acid type fuel cell have been disclosed which are able to withstand deterioration in the presence of phosphoric acid, as well as a sealing arrangement wherein bonds of an improved construction are interposed between the gasket and the electrodes of the fuel cell so as to improve the seal around the fuel cell unit while minimizing deterioration of the bonds. Although several embodiments of the invention have been described and illustrated, various modifications may be made in these embodiments without departing from the spirit and scope of the invention, as defined by the appended claims.

I claim:

1. A fuel cell comprising a pair of electrodes, an electrolyte comprised of phosphoric acid interposed between said electrodes, a gasket and a bond positioned between at least one of said electrodes and said gasket, said bond being comprised of fluoric synthetic rubber and having a modulus of elasticity larger than the modulus of elasticity of said gasket.

2. A fuel cell as recited in claim 1, wherein said gasket is comprised of closed-cellular sponge rubber.

3. A fuel cell as recited in claim 1, wherein said gasket is comprised of fluoric synthetic sponge rubber.

4. A fuel cell comprising a pair of electrodes, an electrolyte comprised of phosphoric acid interposed between said electrodes and a gasket comprised of a metal oxide free and metal hydroxide free fluoric synthetic rubber wherein said gasket comprises two pieces, each of said gasket pieces having a smooth contact surface in contact with one of said electrodes so as to completely seal the outer edges of the fuel cell.

5. A fuel cell as recited in claim 4, wherein said gasket is comprised of fluoric synthetic sponge rubber.

6. A fuel cell comprising a pair of electrodes, an electrolyte comprised of phosphoric acid interposed between said electrodes and a gasket comprised of two pieces wherein said gasket pieces are comprised of closed-cellular sponge rubber.

* * * * *